Patented Nov. 1, 1949

2,486,465

UNITED STATES PATENT OFFICE 2,486,465

PRODUCTION OF TITANIUM DIOXIDE

Lewis C. Copeland, Palmerton, and Clayton W. Farber, Bowmanstown, Pa., assignors to The New Jersey Zinc Company, New York, N. Y., a corporation of New Jersey No Drawing. Application July 12, 1946, Serial No. 683,150

4 Claims. (Cl. 23—202)

This invention relates to titanium dioxide pigments and more particularly to the production of titanium dioxide by hydrolysis of a titanium sulfate solution obtained by digesting a titaniferous material with sulfuric acid. The object of the invention is an improved method of producing titanium dioxide pigment in its rutile crystalline form.

Titanium dioxide ($TiO_2$) is customarily precipitated by hydrolysis from its salt solutions, such as the sulfate or chloride, heated to near the boiling temperature. After the usual purification and washing treatments, the precipitate is calcined or muffled at an elevated temperature to develop satisfactory pigment properties. Two crystalline forms of titanium dioxide, anatase and rutile, are commonly encountered in pigment production. Titanium dioxide in the anatase crystalline form is customarily precipitated upon hydrolysis of titanium sulfate solutions, whereas titanium dioxide in the rutile crystalline form may be precipitated upon hydrolysis of titanium chloride solutions. Most commercial titanium dioxide pigments are characteristically in the anatase crystalline form since the leaching of titaniferous ores, such as ilmenite, with sulphuric acid is more economical and commercially adaptable than the titanium chloride processes. The index of light refraction of rutile is 2.71, while that of anatase is only 2.52, and on this account many proposals have been made for the conversion of anatase to rutile and for the production of pigments predominantly of the rutile crystalline form. Thus, it has been proposed to produce rutile by calcination of crude anatase at high temperatures (around 1000° C.), and the transition is said to be catalyzed by such agents as zinc oxide, antimony oxide, lead oxide etc. Special precipitations employing rutile-forming seeds (frequently prepared from titanium solutions of monobasic acids), precipitations prepared in the absence of polybasic anions (e. g. from titanium tetrachloride solutions), precipitations carried only partly to completion, and hydrolysis under pressure in the presence of rutile seeds have also been proposed for promoting the production of rutile.

It has heretofore been recognized that phosphates in common with other polyvalent anions such as sulfates, under certain conditions, tend to inhibit the conversion of anatase to rutile. In U. S. Patent 2,358,167 a rutile pigment is prepared by mixing crude rutile with crude anatase containing no more than 1 part sulfuric acid ($H_2SO_4$) per 100 parts $TiO_2$, slurrying the mixed titanium dioxides in a monobasic acid solution and autoclaving under pressure at a temperature of 150 to 350° C. to convert all of the titanium dioxide to the rutile form. The patent states that if the phosphate content (calculated as phosphorus pentoxide—$P_2O_5$) of the crude anatase is more than 0.25% $P_2O_5$ on the $TiO_2$ basis, it is necessary to increase the amount of rutile used from 20 to 40%. On the other hand, it is possible, by special procedures, to produce rutile in the presence of considerably larger quantities of phosphates as evidenced by rutile pigments now on the market with a $P_2O_5$ content in the range of 0.2 to 0.3%.

We have discovered that rutile titanium dioxide pigment of excellent quality can be prepared from titanium sulfate solutions by employing either the Blumenfeld method of hydrolysis (U. S. Pat. 1,795,467) or the Mecklenburg method of hydrolysis (U. S. Pat. 1,758,528), provided the $P_2O_5$ content of the titanium sulfate solution is less than 0.025% on the basis of the $TiO_2$ content of the solution. The titanium sulfate solution may be of normal titanium content (200–250 grams $TiO_2$ per liter) and acid-to-titanium ratio (about 2 parts $H_2SO_4$ per part $TiO_2$), but differs from those usually obtained in digesting and leaching Indian ilmenite ores in that it contains $\frac{1}{10}$ or less the amount of phosphorus. The crude anatase resulting from essentially complete precipitation of the titanium from a titanium sulfate solution of such low phosphorus content, by either of the aforementioned methods of hydrolysis, can be converted to a rutile pigment of excellent brightness and opacity by muffling for a period as short as one hour at a temperature as low as 925° C., without the need for promoters or endpointing reagents. When these methods of hydrolysis are used with titanium sulfate solutions having the relatively high $P_2O_5$ content (e. g. 0.4%) of those normally encountered in commerce, a crude anatase results which can be converted to 100 percent rutile only by muffling at a temperature in the neighborhood of 1000° C. for a time sufficient to result in excessive growth of the pigment particles, or by the use of promoters for the transition such as zinc oxide etc.

The present invention thus comprises an improved process of producing rutile titanium dioxide which is characterized by precipitating titanium dioxide by hydrolysis of a titanium sulfate solution containing less than 0.025% $P_2O_5$ on the basis of the $TiO_2$, and by calcining the resulting precipitate at a temperature within the range of 900 to 975° C. for 1 to 2 hours. The titanium dioxide in the crude precipitate or hydrolysate is in the characteristic anatase form, but in consequence of its very low phosphorus content, it is substantially all converted to rutile by simple calcination at temperatures and times adequate for development of satisfactory pigment properties without excessive growth of pigment particles. For substantially complete conversion of anatase to rutile, the titanium sulfate solution should contain less than 0.02% and preferably less than 0.01% $P_2O_5$ on the basis of the $TiO_2$. Anatase of such low phosphorus content is readily converted to rutile by simple calcination at temperatures not exceeding 950° C. for about one hour. Titanium sulfate solutions of the characteristic very low phosphorus content may be prepared in various ways, as for example from titaniferous ores or materials of very low phosphorus content, or by special procedures or methods of treatment for eliminating phosphorus.

Most titaniferous ores contain appreciable quantities of phosphorus. Industrial Minerals and Rocks, A. I. M. E. 1937, page 906, shows 0.67% to 1.0% $P_2O_5$ for Piney River ore, 0.17% $P_2O_5$ for American rutile, 0.17 to 0.26% for Indian ilmenite and 0.02 to 0.06% for Norwegian ore. When such ores are digested with sulfuric acid and then leached to produce a titanium sulfate solution by the conventional procedures, most of the phosphorus is found in the solution and is subsequently precipitated with or is adsorbed on the crude titanium dioxide. The presence of phosphorus in crudes prepared by conventional procedures may readily be determined by analysis and is sufficient to inhibit the formation of rutile by simple calcination at temperatures below 975° C. By smelting these ores to produce pig iron, the titanium can be concentrated in an acid slag of very low phosphorus content, provided the reduction of iron compounds is sufficiently complete to produce a slag of low iron content. Thus, when an Indian ilmenite ore containing 0.17% $P_2O_5$ was smelted in an electric furnace to produce a slag analyzing 72.7% $TiO_2$ and 1.0% Fe, the slag contained 0.007% $P_2O_5$ and the metallic iron contained phosphorus equivalent to 0.6% $P_2O_5$, the phosphorus in the slag and iron products of the smelting operation accounting for 88% of the phosphorus in the original ore. An Allard Lake titaniferous ore containing 0.01% $P_2O_5$ when similarly smelted produced a slag analyzing 68% $TiO_2$, 2.7% Fe and less than 0.005% $P_2O_5$, substantially all of the phosphorus in the original ore having gone into the pig iron product.

Such smelting is an effective way of producing from titaniferous ores, of either high or low phosphorus content, a titanium concentrate suitable for preparing titanium sulfate solutions of the characteristically low phosphorus content for the practice of the invention, as illustrated in the following Table 1. Slags produced as aforesaid in smelting Indian ilmenite ore and Allard Lake ore were digested with sulfuric acid in the conventional manner to produce titanium sulfate solutions, which were subjected to hydrolysis in accordance with the aforementioned Blumenfeld method, and the resulting crude titanium dioxides (100% in the anatase form) were muffled for one hour at 925° C. For purposes of comparison, the table includes pigments similarly produced from titanium sulfate solutions prepared by direct sulfuric acid digestion of the same ores.

*Table 1*

| Slag from— | Slag analysis | | | $P_2O_5$ in Crude $TiO_2$[1] | Rutile after Muffling |
|---|---|---|---|---|---|
| | $TiO_2$ | Fe | $P_2O_5$ | | |
| | Percent | Percent | Percent | Percent | Percent |
| Allard Lake | 68 | 2.7 | <0.005 | <0.005 | 100 |
| Ilmenite | 72.7 | 1.0 | 0.007 | 0.009 | 100 |
| Ilmenite (Poorly reduced) | 57.1 | 8.0 | 0.04 | 0.07 | None |

[1] Obtained by precipitation from titanium sulfate solutions prepared by sulfuric acid digestion of slags.

| Ore | Ore analysis | | | $P_2O_5$ in Crude $TiO_2$[1] | Rutile after Muffling |
|---|---|---|---|---|---|
| | $TiO_2$ | Fe | $P_2O_5$ | | |
| | Percent | Percent | Percent | Percent | Percent |
| Allard Lake | 36.2 | 44.4 | 0.01 | 0.04 | None |
| Ilmenite | 59.4 | 26.2 | 0.17 | 0.2–0.3 | None |

[1] Obtained by precipitation from titanium sulfate solutions prepared by direct sulfuric acid digestion of ores.

The foregoing table illustrates the low phosphorus contents obtainable in the titanium-bearing smelting slags when sufficiently low in iron and the effect of the phosphorus contents on the subsequent production of rutile pigment. The result obtained with the poorly reduced slag of relatively high phosphorus content indicates that the phosphorus content of the slags is the controlling factor in rutile production rather than some other factor associated with the particular titanium compounds present. The exact state of iron reduction required to produce a slag sufficiently low in phosphorus from a given ore to permit the production of rutile in accordance with the invention cannot be definitely defined, but reduction of the iron compounds in the smelting charge must be sufficiently complete to produce a slag of low iron content and consequently of very low phosphorus content. Rutile pigments have been produced in accordance with the invention from titanium sulfate solutions prepared from numerous metallurgical slags resulting from the smelting of Florida ilmenite, Indian ilmenite, and Allard Lake ores, and varying in $TiO_2$ content from 63 to 73% and from 1 to 3% iron. Certain of these slags were produced in the smelting of ilmenite in a reverberatory furnace.

The titanium-bearing smelting slags of very low phosphorus content make it possible to take advantage of the relative simplicity of the Blumenfeld method of hydrolysis and the good yields (95% or higher), fine particle size, and generally good pigment characteristics associated with that method, in producing a rutile pigment. Equally good quality rutile pigment is also obtainable from titanium sulfate solutions prepared from these slags when the hydrolysis is carried out in accordance with the Mecklenburg method. In the following Table 2, the color, brightness, and tinting strength of two 100% rutile pigments A and B produced in accordance with the invention from an electric furnace slag (employing respectively the Blumenfeld and Mecklenburg methods of hydrolysis) are compared with a commercial high opacity rutile pigment (C), and a pure titanium dioxide pigment D in the anatase form customarily employed as a standard in color and brightness gradings. The slag was produced in the smelting of Allard Lake ore and contained (by analysis) 68% $TiO_2$, 2.7% Fe and less than 0.005% $P_2O_5$.

Phosphorus was added in the form of both phosphoric acid and titanous phosphate to the titanium sulfate solution (of low phosphorus content) obtained by digesting the aforementioned titanium-bearing slag obtained in smelting Allard Lake ore. The quantity of phosphorus compound added was, in each case, sufficient to correspond to 0.4% $P_2O_5$ on the basis of the $TiO_2$ content, which is the amount customarily present in the usual commercial titanium sulfate solutions. Pigments prepared from the two solutions by the Blumenfeld method of hydrolysis, and muffling of the hydrolysate for one hour at 925° C. consisted of 100% anatase. As previously stated, the titanium sulfate solution, without phosphorus addition, yields a crude precipitate readily converted to rutile by muffling for one hour at 925° C.

In order to investigate the possibility that some unusual seeding phenomenon associated with the low phosphorus titanium sulfate solution might be responsible for the production of the readily convertible anatase rather than the low phosphorus content itself, an experiment was performed using (1) a solution prepared from ilmenite ore that contained 0.17% $P_2O_5$ and regularly produced anatase and (2) a solution prepared from an electric furnace slag that contained less than 0.005% $P_2O_5$ and regularly produced rutile. Seeds were produced from both solutions according to the procedure of the aforementioned Mecklenburg patent. Four precipitates were then prepared involving both solutions and 2% of both kinds of seeds and muffled for one hour over the range of temperatures recited, with the results shown in Table 4.

Table 2

| Pigment | Visible Color and Brightness Gradings | | | | Photometric Brightness | Tinting Strength |
|---|---|---|---|---|---|---|
| | Light Colored Vehicle | | Dark Colored Vehicle | | | |
| | Color | Brightness | Color | Brightness | | |
| A | Sl. more yellow | Equal | Sl. more yellow | Equal | 93.3 | 149 |
| B | do | −1 | More yellow | +2 | 93.3 | 147 |
| C | Dist. more yellow | −2 | Sl. more yellow | +1 | 93.1 | 145 |
| D (Standard) | Equal | Equal | Equal | Equal | 94 | 100 |

The two pigments A and B produced in accordance with the invention compare favorably with the standard D in color and brightness and possess tinting strengths slightly higher than the high opacity rutile pigment C now marketed.

In order to determine the effect of phosphorus on the conversion of anatase to rutile by simple calcination, varying amounts of $P_2O_5$ were added to different lots of the crude anatase obtained as aforesaid from the slag resulting from the electric furnace smelting of Allard Lake ore. The mixtures of anatase and $P_2O_5$ were muffled for one hour at 925° C., and the resulting pigments examined for rutile content. The results are given in Table 3.

Table 3

| $P_2O_5$ addition to crude anatase | Rutile content after muffling 1 hour at 925° C. |
|---|---|
| Percent | Percent |
| None | 100 |
| 0.002 | 100 |
| 0.005 | 100 |
| 0.01 | 100 |
| 0.025 | 50 |
| 0.05 | None |

The foregoing table shows that the $P_2O_5$ content of the titanium sulfate solution on the basis of its $TiO_2$ content must be held below 0.025% in order to insure obtaining a high rutile content at low muffling temperatures. With crudes containing less than 0.005% $P_2O_5$, 100% rutile pigments have occasionally been produced at muffling temperatures as low as 900° C. On the other hand, it is sometimes necessary to increase the muffling temperature to 950° C. or slightly higher in order to obtain 100% rutile even though the $P_2O_5$ content of the crude anatase may be well below 0.025%. These variations in required muffling temperature may be due, in part at least, to the difficulties of measuring and maintaining uniform temperatures, especially in small muffles, and to slight inaccuracies in phosphorus determinations. The determination of phosphorus in the amounts herein involved in terms of absolute values is difficult and the percentage figures arrived at may be only relative. The phosphorus contents ($P_2O_5$%) recited throughout this specification with respect to titanium sulphate solutions were determined by a turbidimetric method involving precipitation of the phosphorus as ammonium phospho-molybdate.

The following experiment further demonstrates that the low phosphorus content of the titanium sulfate solution is the primary cause of the production of a crude anatase readily convertible by simple calcination to good quality rutile:

Table 4

| Temp., °C. | Ilmenite Solution | | | |
|---|---|---|---|---|
| | 2% Ilmenite Seeds | | 2% Slag Seeds | |
| | Per Cent Rutile | Per Cent $P_2O_5$ on Crude $TiO_2$ | Per Cent Rutile | Per Cent $P_2O_5$ on Crude $TiO_2$ |
| 920 | 0 | 0.23 | 0 | 0.20 |
| 940 | 0 | 0.23 | 0 | 0.20 |
| 975 | 0 | 0.23 | 0 | 0.20 |

| Temp., °C. | Slag Solution | | | |
|---|---|---|---|---|
| | 2% Ilmenite Seeds | | 2% Slag Seeds | |
| | Per Cent Rutile | Per Cent $P_2O_5$ on Crude $TiO_2$ | Per Cent Rutile | Per Cent $P_2O_5$ on Crude $TiO_2$ |
| 900 | | | 70 | <0.005 |
| 925 | 20 | <0.005 | 100 | <0.005 |
| 950 | 30 | <0.005 | 100 | <0.005 |
| 975 | 100 | <0.005 | | |

It is evident from Table 4 that regardless of the source of the seed used to precipitate from the ilmenite solution, only anatase was produced over the range of calcination temperatures. However, from the slag solution, rutile was produced at relatively low muffling temperatures. The fact that the ilmenite seeds produced (from the slag solution) a pigment that required a higher calcination temperature to produce rutile than was required for the pigment produced from the same solution with slag seeds may possibly be due to additional phosphorus associated with the ilmenite seeds.. Accurate phosphorus determinations in this extremely low range are difficult and this accounts for the fact that any difference in the phosphorus content of these two pigments is not indicated by the analysis.

Titanium sulfate solutions prepared from metallurgical slags differ from those obtained by the direct digestion of ilmenite not only in their phosphorus content but also in that they contain less iron sulfate but more aluminum and magnesium sulfates. In order to check on the possibility that the kind and amount of associated sulfates might be a factor in determining the relative ease with which rutile pigments are prepared from these slag solutions, aluminum and magnesium sulfates were added to an Indian ilmenite solution of normal $P_2O_5$ content, in the amount in which they are present in the low phosphorus slag solutions. The crude $TiO_2$ prepared from this solution by the Mecklenburg method, when muffled for one hour at 925° C., gave a pigment which was 100% anatase as did the same solution without the added sulfates. In a like manner iron sulfate was added to the low phosphorus slag solution so as to bring its iron content up to that of the ilmenite solution. This solution yielded a crude $TiO_2$ which muffled to 95% rutile in one hour at 925° C.

As a further check on the inhibiting action of phosphorus on rutile formation, a phosphorus-free titanium sulfate solution was prepared from titaniferous ore by a procedure other than by going through the smelting operation. Titanium tetrachloride ($TiCl_4$) was made by chloridization of ilmenite and subsequently purified. The purified titanium tetrachloride was then oxidized with air in the vapor phase to produce titanium dioxide. The crude titanium dioxide was muffled at a sufficiently high temperature to eliminate any chlorine remaining on the pigment and digested with sulfuric acid to produce a titanium sulfate solution of normal $TiO_2$ content and acid-to-titanium ratio. When this solution was hydrolyzed by the Blumenfeld method and the resulting crude hydrolysate analyzed, only an insignificant quantity of phosphorus could be detected, indicating that it contained less than 0.005% $P_2O_5$. When the crude was muffled for one hour at 925° C., a pigment consisting of 100% rutile was obtained. When 0.25% $P_2O_5$, an amount falling within the range of the $P_2O^5$ contents of pigments prepared by direct sulfuric acid digestion of Indian ilmenite, was added to this crude prior to muffling, a pigment consisting of 100% anatase was obtained.

Although Allard Lake titaniferous ore is lower in phosphorus (0.01$P_2O_5$) than most other titaniferous ores, the crude titanium dioxide obtained by hydrolysis of the titanium sulfate solution prepared directly from this ore by conventional methods contains sufficient phosphorus (0.04% $P_2O_5$) so that when muffled for one hour at 925° C. an anatase pigment is obtained. By a preliminary leaching of this ore with a 10% sulfuric acid solution, the greater part of the phosphorus is eliminated, and the treated ore contains only about 0.002% $P_2O_5$. The treated ore is then digested with sulfuric acid in the customary manner to prepare a titanium sulfate solution, which when subjected to hydrolysis by the Blumenfeld method yields a crude titanium dioxide of sufficiently low phosphorus content (e. g. 0.007% $P_2O_5$) to produce a 100% rutile pigment when muffled for one hour at 925° C.

A titanium sulfate solution of very low phosphorus content can be prepared from an Indian ilmenite ore (containing 0.17% $P_2O_5$) by first digesting the ore with sulfuric acid in the conventional manner and thereby producing a titanium sulfate solution. From this solution, titanium sulfate crystals are precipitated by salting out with excess sulfuric acid. These crystals are washed with alcohol to remove the mother liquor, redissolved and crystallized a second time by salting out with sulfuric acid. The latter crystals are washed with alcohol, and then dissolved to form a titanium sulfate solution, which when hydrolyzed by the Blumenfeld method yields a crude titanium dioxide of sufficiently low phosphorus content (e. g. 0.005% $P_2O_5$) to produce a 100% rutile pigment when muffled for one hour at 925° C.

We claim:

1. In the process of producing rutile titanium dioxide pigment by hydrolysis of a titanium sulfate solution to precipitate anatase titanium dioxide and calcining the anatase at an elevated temperature for a period of time sufficient to convert it to rutile, the improvement which comprises effecting conversion of the anatase to rutile without excessive growth of particle size and in the absence of a conditioning agent or rutile seed for promoting such conversion by first removing the $P_2O_5$ during the course of the production of the anatase in such manner that its $P_2O_5$ content is below 0.025% on the basis of the $TiO_2$, and then directly effecting conversion of the anatase predominantly to rutile without deterioration of its pigmentary qualities by calcining the resulting substantially phosphorus-free anatase product at a temperature of 900–975° C. for a period of 1 to 2 hours.

2. In the process of producing rutile titanium dioxide pigment by hydrolysis of a titanium sulfate solution to precipitate anatase titanium dioxide and calcining the anatase at an elevated temperature for a period of time sufficient to convert it to rutile, the improvement which comprises effecting conversion of the anatase to rutile without excessive growth of particle size and in the absense of a conditioning agent or rutile seed for promoting such conversion by first removing the $P_2O_5$ during the course of the production of the anatase in such manner that its $P_2O_5$ content is below 0.025% on the basis of the $TiO_2$, and then directly effecting substantially complete conversion of the anatase to rutile without deterioration of its pigmentary qualities by calcining the resulting substantially phosphorus-free anatase product at a temperature of 900–975° C. for a period of 1 to 2 hours.

3. In the process of producing rutile titanium dioxide pigment by hydrolysis of a titanium sulfate solution to precipitate anatase titanium dioxide and calcining the anatase at an elevated temperature for a period of time sufficient to convert it to rutile, the improvement which comprises effecting conversion of the anatase to rutile without excessive growth of particle size and in the absence of a conditioning agent or rutile seed for promoting such conversion by first removing the $P_2O_5$ during the course of the production of the anatase in such manner that its $P_2O_5$ content is below 0.01% on the basis of the $TiO_2$, and then directly effecting substantially complete conversion of the anatase to rutile without deterioration of its pigmentary qualities by calcining the resulting substantially phosphorus-free anatase product at a temperature of 900–950° C. for a period of about one hour.

4. In the process of producing rutile titanium dioxide pigment by hydrolysis of a titanium sulfate solution to precipitate anatase titanium dioxide and calcining the anatase at an elevated temperature for a period of time sufficient to convert it to rutile, the improvement which comprises effecting conversion of the anatase to rutile without excessive growth of particle size and in the absence of a conditioning agent or rutile seed for promoting such conversion by first removing the $P_2O_5$ during the course of the production of the anatase in such manner that its $P_2O_5$ content is below 0.005% on the basis of the $TiO_2$, and then directly effecting substantially complete conversion of the anatase to rutile without deterioration of its pigmentary qualities by calcining the resulting substantially phosphorus-free anatase product at a temperature of about 925° C. for a period of about one hour.

LEWIS C. COPELAND.
CLAYTON W. FARBER.

REFERENCES CITED

The following references are of record in the file of this patent:

UNITED STATES PATENTS

| Number    | Name          | Date           |
|-----------|---------------|----------------|
| 1,106,406 | Rossi et al.  | Aug. 11, 1914  |
| 1,184,131 | Rossi         | May 23, 1916   |
| 1,223,356 | Barton        | Apr. 24, 1917  |
| 1,325,561 | Farup         | Dec. 23, 1919  |
| 1,489,183 | Weizman et al.| Apr. 1, 1924   |
| 1,831,852 | Farup         | Nov. 17, 1931  |
| 2,358,167 | Keats et al.  | Sept. 12, 1944 |

FOREIGN PATENTS

| Number  | Country       | Date           |
|---------|---------------|----------------|
| 184,948 | Great Britain | Aug. 31, 1922  |
| 253,550 | Great Britain | July 28, 1927  |
| 288,569 | Great Britain | May 30, 1929   |